M. LIDSTER & C. ANDERSEN.
SHAFT CENTERING DEVICE.
APPLICATION FILED NOV. 3, 1913.
1,097,036.
Patented May 19, 1914.
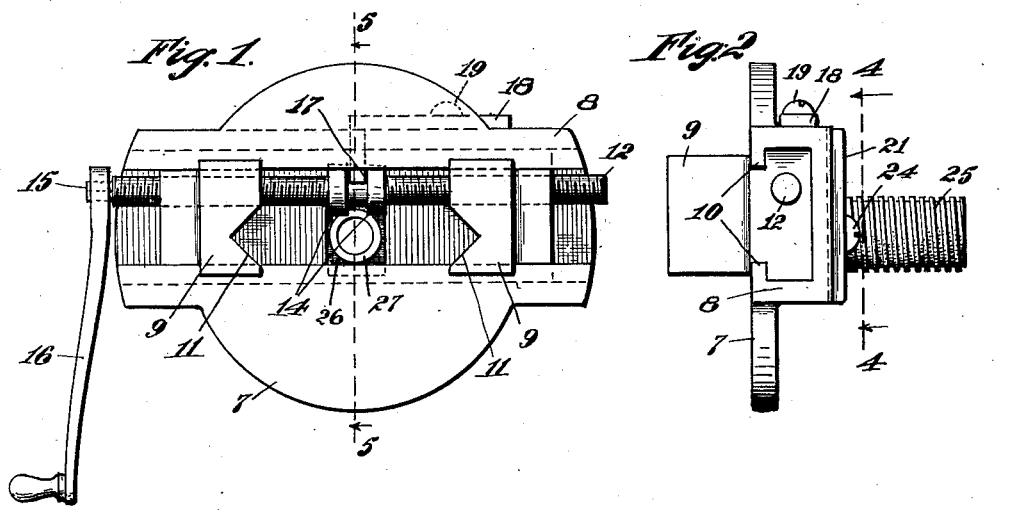
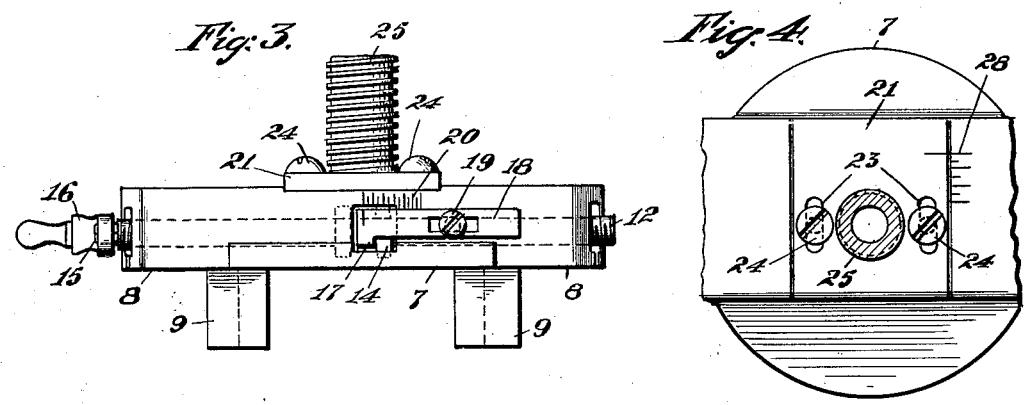
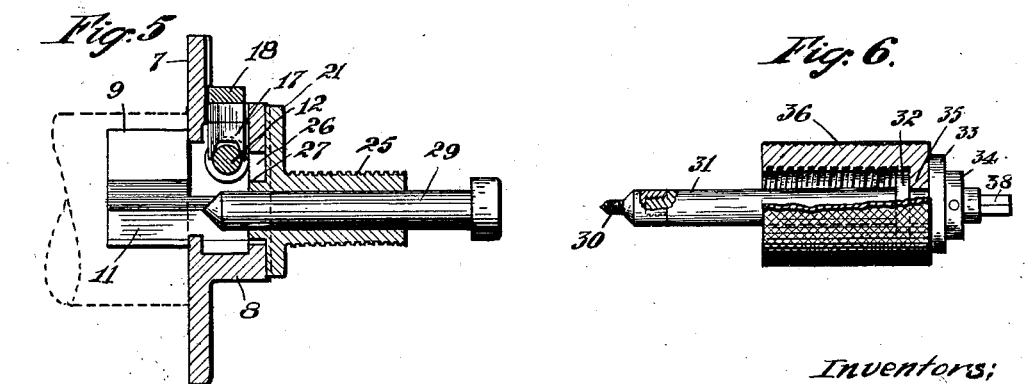
Witnesses:
Inventors:
Milner Lidster
Chas. Andersen
By
Attys.

UNITED STATES PATENT OFFICE.

MILNER LIDSTER AND CHARLES ANDERSEN, OF LOS ANGELES, CALIFORNIA.

SHAFT-CENTERING DEVICE.

1,097,036.  Specification of Letters Patent. Patented May 19, 1914.

Application filed November 3, 1913. Serial No. 798,891.

*To all whom it may concern:*

Be it known that we, MILNER LIDSTER and CHARLES ANDERSEN, both citizens of the United States, residing at Los Angeles, in the county of Los Angeles, State of California, have invented new and useful Improvements in Shaft-Centering Devices, of which the following is a specification.

This invention relates to shaft centering devices, and the principal object is to provide a shaft centering device having parallel gaging jaws adapted to be coincidently advanced toward a centering tool.

It is also an object to provide a centering device with means by which the same may be adjusted to eccentrically locate a turning point upon the shaft.

It is also an object to provide adjustable gages to properly locate the eccentrically located point.

It is a further object to provide a threaded sleeve to support a punching tool and a boring tool alternately.

In the drawings accompanying this specification, Figure 1 is an elevation viewed from the face or chuck side of the device. Fig. 2 is a side elevation with the device in position shown in Fig. 1. Fig. 3 is a plan view. Fig. 4 is a transverse section on the line 4—4 of Fig. 2, viewed in the direction indicated by the arrows. Fig. 5 is a longitudinal section on the line 5—5 of Fig. 4 showing the punching tool in position. Fig. 6 is a detail elevation with the parts partly broken away of the drilling attachment used to follow the punching tool.

More specifically in the drawings, 7 designates the face plate of the device having a transverse channel 8 formed integral therewith within which are slidably mounted the chuck blocks 9, the flange 10 of the channeled portion 8 engaging therewith and securely holding the blocks in slidable relation to the body formed by the circular face plate and the channeled portion. Each one of the blocks 9 is longitudinally bored, preferably to one side of the annular notches 11 formed therein, the bores in each being threaded in reverse direction and adapted to form a support for the similarly threaded shaft 12 which is provided with two annular flanges 14 mid-way of the ends thereof. One end of this shaft is reduced in size and squared or otherwise formed, this portion 15 projecting beyond the end of the channeled body when the shaft is properly mounted and arranged to receive the operating crank 16. The flanges are so arranged as to provide a groove intermediate their inner faces which is normally in line with the center of the device and is retained in this position or in an eccentric position by means of the adjustable key 17 which projects through a slot in the channeled structure and is provided with a slotted arm 18 held in position by means of a headed screw 19 carried through the slot, a gage 20 being provided so that the adjustment of this arm with its key may be made without the use of measuring tools.

A block 21 is slidably mounted in a slot transversely cut across the channeled portion of the body and on the rear face thereof and is also provided with slots 23 which are engaged by the headed screws 24 threaded into the body portion, this block having formed thereon a stud or sleeve 25 which is externally threaded and the bore therethrough registering with a transverse slot 26, a stud 27 on the block preferably engaging in the slot so that the axial line of this bore may be adjusted in relation to the center of the plane intersecting the mid-points in the notches 11. This block 21 is also provided with a gage 28 by which the measurement may be accurately made. The bore in the sleeve 25 is provided for the introduction of a punching tool 29 or a drill bit 30, this drill bit being mounted upon a shaft 31 which is adapted to be inserted within and closely fit the bore of the sleeve, this shaft having a flange 32 formed thereon intermediate of which and the flange 33 formed upon the sleeve 34 secured to the shaft 31 is engaged the flange 35 of the internally threaded sleeve 36, this sleeve being adapted to engage the threads on the sleeve 25 so that the cutting tool may be advanced as desired. The oppositely disposed end of the shaft 31 is also squared as shown at 38 and preferably of similar form to the portion 15 previously described so that the crank 16 may be used alternately on either one of the ends.

The operation of the device will be readily understood. It being desired to accurately center a rough shaft the jaws of the blocks are opened to a point beyond that necessary to grasp the shaft and the same is clamped therein by turning the reversely threaded shaft 12, and when this action is completed the punching tool is inserted and a punch made to accommodate the cutting or centering tool which is inserted after the withdrawal of the punch and turned in the proper direction by the crank, the necessary advance being produced by turning the knurled sleeve 36 to advance the tool. The eccentric points desired in relation to the shaft are readily formed by shifting the block 21 or the key 17, as desired. To accommodate smaller sized shafts than that to be included in the normal scope of the jaws adjustable plates may be included therewith.

What we claim is:

1. A centering device, comprising a channeled body, slidable jaws mounted thereon having threaded bores therethrough, a reversely threaded shaft adapted to engage the threaded bores and be supported therein, and means adapted to engage said shaft intermediate said threaded portion to shift said shaft in relation to said body member.

2. A centering device, having a body member provided with a channeled portion and face plate, clutching jaws slidably mounted in said channeled portion projecting beyond said face plate having bores therethrough reversely threaded, a grooved shaft reversely threaded on either side of said groove and adapted to engage within said reversely threaded bores and be supported therein, an adjustable key adapted to engage said groove in said shaft, means to turn said shaft, and a centering block adjustably mounted transversely in relation to said shaft.

3. A centering device, having a body member provided with a channeled portion and face plate, clutching jaws slidably mounted in said channeled portion projecting beyond said face plate having bores therethrough reversely threaded, a grooved shaft reversely threaded on either side of said groove and adapted to engage within said reversely threaded bores and be supported therein, an adjustable key adapted to engage said groove in said shaft, means to turn said shaft, a centering block transversely adjustable in relation to said grooved shaft, a threaded sleeve projecting outwardly from said plate, and a center cutting tool adapted to be adjustably advanced in relation to the sleeve and centering device.

4. A centering device, comprising a channeled body having an aperture formed therein, clutching jaws slidably mounted thereon, means to advance and retract said jaws coincidently, means to adjust the relation of said jaws to said body member, and an apertured centering block movably mounted in the aperture of the body member, whereby the block may be adjusted at right angles to the movement of the clutch jaws.

In witness that we claim the foregoing we have hereunto subscribed our names this 23rd day of October, 1913.

MILNER LIDSTER.
CHAS. ANDERSEN.

Witnesses:
MERLE HAMMOND,
MARIE BATTEY.